United States Patent [19]
Tuttle et al.

[11] Patent Number: 6,101,375
[45] Date of Patent: *Aug. 8, 2000

[54] METHODS AND SYSTEMS FOR GAIN ADJUSTMENT IN TWO-WAY COMMUNICATION SYSTEMS

[75] Inventors: John R. Tuttle; Charles K. Snodgrass, both of Boise, Id.

[73] Assignee: Micron Technology, Inc., Boise, Id.

[*] Notice: This patent is subject to a terminal disclaimer.

[21] Appl. No.: 09/111,048

[22] Filed: Jul. 7, 1998

Related U.S. Application Data

[63] Continuation of application No. 08/726,612, Oct. 7, 1996, Pat. No. 5,778,309, which is a continuation of application No. 08/430,711, Apr. 27, 1995, Pat. No. 5,613,228, which is a continuation of application No. 08/206,471, Mar. 3, 1994, abandoned, which is a continuation of application No. 07/909,370, Jul. 6, 1992, abandoned.

[51] Int. Cl.⁷ ...................................................... H04B 1/02
[52] U.S. Cl. ............................ 455/127; 455/70; 455/522
[58] Field of Search ............................... 455/69, 522, 88, 455/70, 38.3, 343, 92, 127, 68; 340/825.54, 825.06, 825.44, 539; 375/345

[56] References Cited

U.S. PATENT DOCUMENTS

| | | | |
|---|---|---|---|
| 3,986,119 | 10/1976 | Hemmer, Jr. et al. | 455/15 |
| 4,741,018 | 4/1988 | Potratz et al. | 455/72 |
| 4,811,421 | 3/1989 | Havel et al. | 455/126 |
| 4,868,795 | 9/1989 | McDavid et al. | 455/69 |
| 5,003,619 | 3/1991 | Morris et al. | 455/127 |
| 5,030,807 | 7/1991 | Landt et al. | 235/375 |
| 5,144,314 | 9/1992 | Malmberg et al. | 342/44 |
| 5,220,678 | 6/1993 | Feei | 455/127 |
| 5,231,273 | 7/1993 | Caswell et al. | 455/38.3 |
| 5,278,992 | 1/1994 | Su et al. | 455/69 |
| 5,430,760 | 7/1995 | Dent | 455/70 |
| 5,778,309 | 7/1998 | Tuttle et al. | 455/127 |

FOREIGN PATENT DOCUMENTS 2-256331   1/1991   Japan .

*Primary Examiner*—Fan S. Tsang
*Assistant Examiner*—Lee Nguyen
*Attorney, Agent, or Firm*—Trask, Britt & Rossa

[57] ABSTRACT

A method for reducing the dynamic range required of an automatic gain control (AGC) circuit in a remote transceiver in 2-way communication between local and remote transceivers. By repeatedly transmitting a signal with successively increasing power from one transceiver until a response is received from the other transceiver, the dynamic range and hence complexity of the receiving circuit may be greatly reduced. The operating power of the remote transmitter can then be adjusted according to the level used by the local transmitter, thereby promoting the efficent use of the remote's power supply.

11 Claims, 3 Drawing Sheets

METHODS AND SYSTEMS FOR GAIN ADJUSTMENT IN TWO-WAY COMMUNICATION SYSTEMS

CROSS-REFERENCE TO RELATED APPLICATIONS

This application is a continuation of application Ser. No. 08/726,612 filed Oct. 7, 1996, now U.S. Pat. No. 5,778,309; which is a continuation of application Ser. No. 08/430,711 filed Apr. 27, 1995, now U.S. Pat. No. 5,613,228; which is a continuation of application Ser. No. 08/206,471 filed Mar. 3, 1994, now abandoned; which is a continuation of application Ser. No. 07/909,370 filed Jul. 6, 1992, now abandoned.

FIELD OF THE INVENTION

This invention relates to 2-way RF data communication between transceivers, specifically to automatic gain control (AGC) in receiver circuits of such transceivers, and more particularly, to the efficient use of the limited power and space available to such transceivers when used as radio frequency identification tags.

BACKGROUND OF THE INVENTION

Often times a given transceiver system is required to operate under widely varying conditions. When the distance between local and remote transceivers varies greatly, the power required to communicate varies accordingly. In the far field, the power required is dictated by the inverse square law: ideally, every time the distance is doubled the power required must be quadrupled. Other factors also impinge on the ability of two transceivers to communicate. Multipath and outside RF source interference can further effect the required transmission level.

In the field of remote transceivers of the type used in RFID tags, there is the added design constraint of package size, available power, and cost. Typically, RFID tags must be small and light-weight, about the size of your average Wheat Thin. Often, this requires the transceiver circuitry be incorporated into a single integrated circuit chip with a very small battery as a power supply.

To conserve the limited power afforded by a small battery, signal transmissions should be as efficient as possible. The tag should use as little power as possible during non-communicating operation. Simpler circuit design dissipates less power and is cheaper to construct.

SUMMARY OF THE INVENTION

The principal and secondary objects of this invention are to provide a method by which the efficiency in communication between local and remote RF transceivers can be further maximized and to reduce complexity of AGC circuits required in the receiver portions of remote transceivers.

These and other objects are achieved by sending successively stronger transmissions from the local transceiver (interrogator) trying to establish the communications link, beginning with minimum power, until a response is received from the remote transceiver (tag). Either transceiver or both transceivers may use information in the signal received in order to decide on the power level used by its transmitter.

Optimally, the tag should remain in a quiescent sleep state using little power during periods of non-communication. When the tag is close to the interrogator, it will wake up from this state when the interrogator transmits at a relatively low power level. When the distance between tag and interrogator is large, the tag will awaken when the interrogator transmits at a relatively high power level. However, the power of the signal received by the tag will be about the same, whether near or far, thus reducing the flexibility required by the tag's receiver circuitry.

DESCRIPTION OF THE PREFERRED EMBODIMENTS OF THE INVENTION

Figure 1:
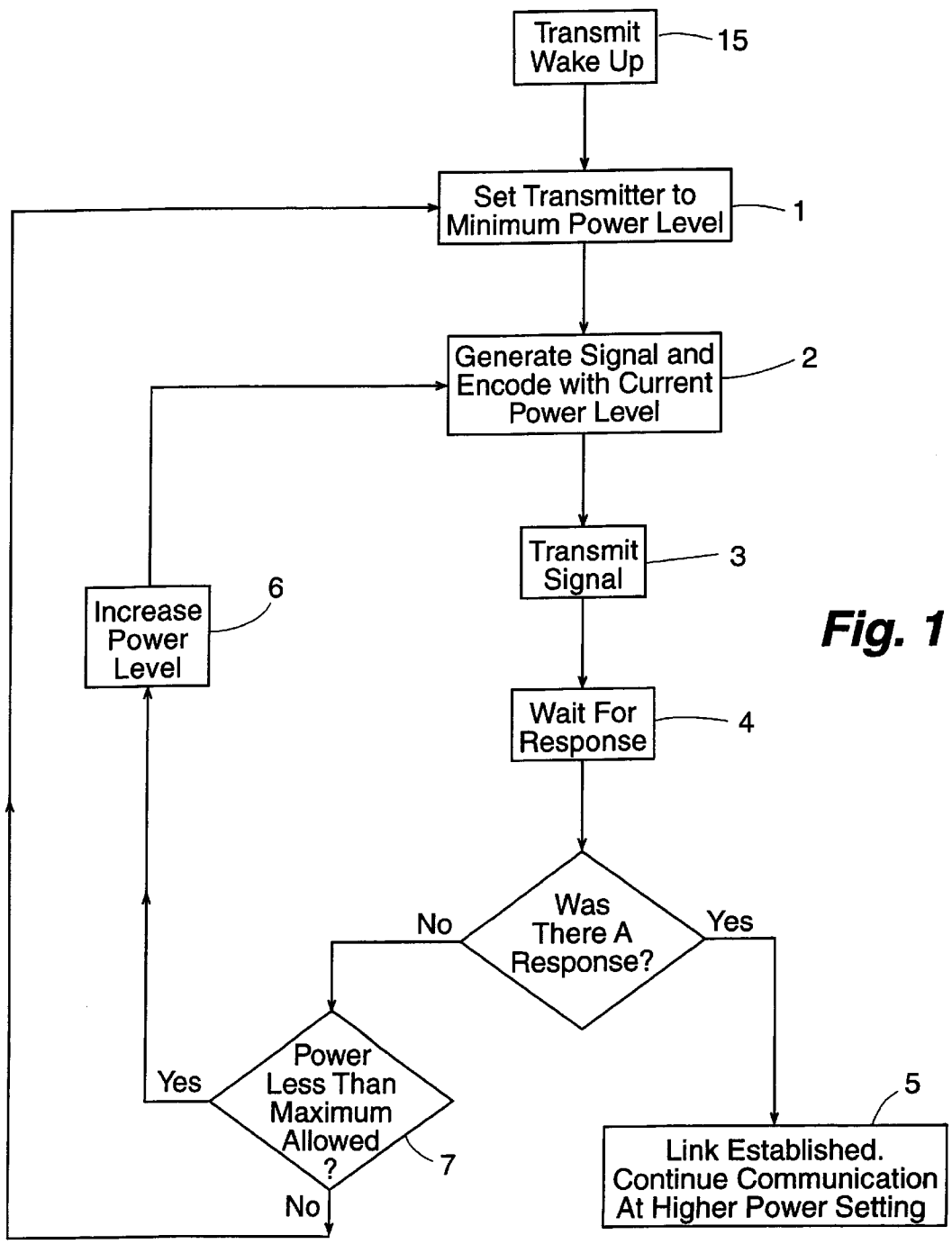
FIG. 1 is a flow chart diagram of the steps taken by the local interrogator transceiver to establish a communication link at an efficient power level.
Figure 3:
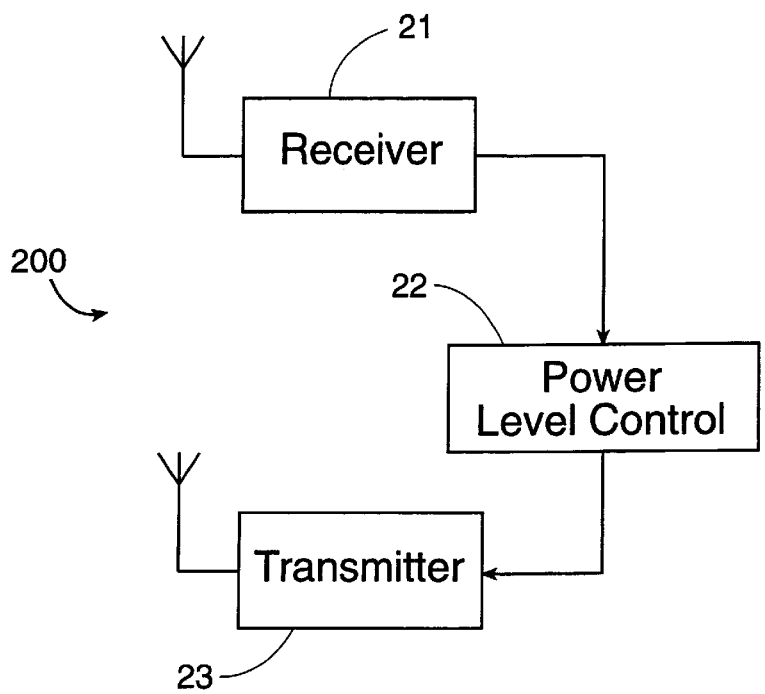
FIG. 3 is a block diagram of a remote RFID tag transceiver according to the invention.
Figure 4:
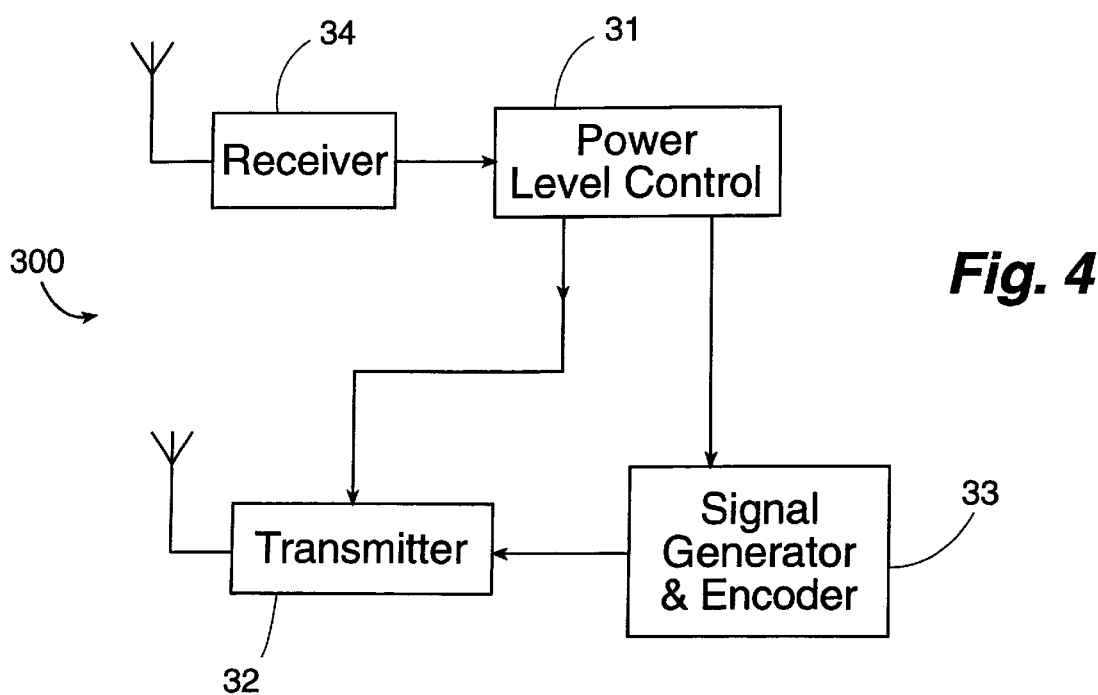
FIG. 4 is a block diagram of an interrogator transceiver according to the invention.

Referring now to FIGS. 1, 3 and 4, the first step in establishing an efficient communication link from interrogator 300 to RFID 200 tag is the step of a power level control circuit 31 setting the transmitter of the interrogator transceiver to a minimum power level (step 1).

Next, a signal to be transmitted is generated by signal generator 33 within the interrogator transceiver (step 2). The frequency and format of this signal is appropriate for sensing by the tag's "wake up" receiver circuit 21. Part of the informational content of this signal may reflect the current transmitter power level.

The signal is then transmitted using the current transmitter power setting (step 3). The first time this is done, the minimum power setting is used.

After the signal is sent, the interrogator must wait for a brief period of time (step 4) for the RFID tag transceiver to respond with a signal of its own.

If the RFID tag transceiver has sent a response and the interrogator receiver circuit 34 has received it, the interrogator will assume that an adequate communication link has been established and will begin communicating information with the RFID tag transceiver (step 5). To improve the signal to noise ratio (SNR) of further communication, the subsequent transmission(s) could be at a predetermined higher level.

If on the other hand, the RFID tag did not send a response or the interrogator did not receive the response, the interrogator will assume that the broadcast output power of the last transmitted signal was too weak. The interrogator will then increase the power level setting on its own transmitter (step 6), may change the informational content of the signal to be sent reflecting the increase in power (step 2), and send another signal (step 3). This signal will be just like the first except for an increase in power and an optional corresponding change in its informational content.

This loop continues until a response from the RFID tag transceiver is received or until the maximum allowable transmitter level is attained (step 7), in which there will be no communication link established, and the entire process can start over (step 1).

Figure 2:
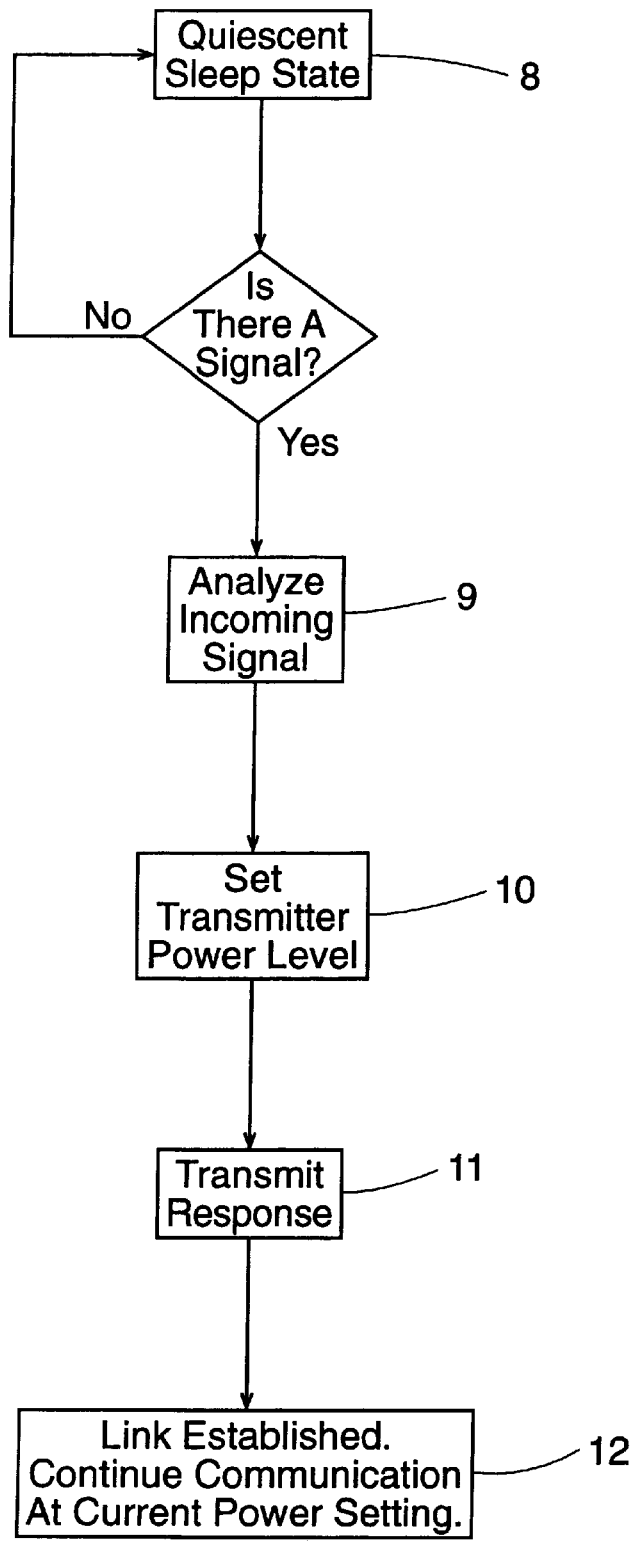
FIG. 2 is a flow chart diagram of the steps taken by the remote RFID tag transceiver in transmitting a response at an efficient power level.

Referring now to FIGS. 2 and 3, the RFID tag 200 is normally in a quiescent sleep state (step 8) using very little power, waiting for a signal from the interrogator.

When a signal of the proper format and frequency arrives, the RFID tag immediately awakens from its sleep and analyzes the incoming signal (step 9). The tag interprets the information in the signal, and its power level control circuit 22 sets the power level (step 10) on its own transmitter 23 according to the amount of power the interrogator used to send the signal. The tag then transmits its response 11.

The communication link between tag and interrogator has been established, and further information can be exchanged between them 12.

In an alternate embodiment, the interrogator first sends out a relatively high power wake-up signal (step 15) to identify those tags within a certain range. Then the interrogator can initiate a similar sequence to establish communication at an efficient power level within the tag.

While the preferred embodiments of the invention have been described, modifications can be made and other embodiments may be devised without departing from the spirit of the invention and the scope of the appended claims.

What is claimed is:

1. A method of interrogating a portable RF transceiver, comprising the steps of:
    providing an interrogator RF transceiver;
    providing a portable RF transceiver that is substantially smaller and lighter than the interrogator RF transceiver;
    the portable RF transceiver detecting whether it receives an interrogation RF signal;
    in response to receiving an interrogation RF signal, the portable RF transceiver transmitting a Response RF signal;
    the interrogator RF transceiver transmitting a first interrogation RF signal at a first power level;
    after transmitting the first interrogation RF signal, the interrogator RF transceiver detecting whether it receives said Response RF signal;
    if the interrogator RF transceiver does not detect that it has received said Response RF signal within a period of time following the transmitting of the first interrogation RF signal, the interrogator RF transceiver transmitting a second interrogation RF signal at a second power level that is higher than the first power level; and
    if the interrogator RF transceiver receives said Response RF signal from the portable RF transceiver, the interrogator RF transceiver transmitting additional signals to the portable RF transceiver at a power level which exceeds by a predetermined amount the power level value of the interrogation signal in response to which the portable RF transceiver transmitted said Response RF signal.

2. A method according to claim 1, further comprising the subsequent steps of:
    after the step of transmitting the second interrogation RF signal, the interrogator RF transceiver detecting whether it receives said Response RF signal;
    if the interrogator RF transceiver does not detect that it has received said Response RF signal within a period of time following a last transmitted interrogation RF signal, the interrogator RF transceiver determining whether the power level of the last transmitted interrogation RF signal is less than a maximum allowable power level and, if not, then returning to the step of transmitting the first interrogation RF signal;
    the interrogator RF transceiver transmitting an interrogation RF signal at a power level that is higher than the power level of the last transmitted interrogation RF signal; and
    returning to the step of, after transmitting the second interrogation RF signal, the interrogator RF transceiver detecting.

3. The method according to claim 1, wherein
    each of the interrogator RF transceiver transmitting steps further comprises the interrogator transceiver encoding the interrogation RF signal to indicate a current power level value; and
    the portable RF transceiver transmitting step further comprises the portable RF transceiver transmitting the Response RF signal at a power level based on the current power level value encoded in the interrogation RF signal received by the portable RF transceiver.

4. The method according to claim 1, further comprising the step of:
    before the step of the interrogator RF transceiver transmitting the first interrogation RF signal, the interrogator RF transceiver transmitting a wake-up RF signal at a power level substantially higher than the first power level.

5. An RF communications system, comprising:
    a portable RF transceiver configured to detect an interrogation RF signal and to transmit a Response RF signal in response to the interrogation RF signal being detected; and
    an interrogator RF transceiver including
    an RF transmitter circuit,
    an RF receiver circuit configured to detect when the interrogator RF transceiver receives said Response RF signal, and
    a power level control circuit configured to command the transmitter circuit of the interrogator RF transceiver to transmit a first interrogation RF signal at a first power level and, if the transceiver circuit of the interrogator RF transceiver does not detect said Response RF signal in response to the first interrogation RF signal, to transmit a second interrogation RF signal at a second power level that is higher than the first power level, said power level control circuit further comprising:
        means for controlling the transmitter circuit of the interrogator RF transceiver, after the receiver circuit of the interrogator RF transceiver senses the Response RF signal, to transmit additional signals to the portable RF transceiver at a power level which exceeds by a predetermined amount the power level of the interrogation RF signal in response to which the portable RF transceiver transmitted said Response RF signal;
    wherein the portable RF transceiver is substantially smaller and lighter than the interrogator RF transceiver.

6. The RF communications system according to claim 5, wherein:
    the RF transmitter circuit of the interrogator RF transceiver encodes each interrogation signal to indicate the power level at which that interrogation signal is transmitted; and
    the portable RF transceiver transmits the Response RF signal at a power level based on the power level encoded in the interrogation signal received by the portable transceiver.

7. The RF communications system according to claim 5, wherein the power level control circuit of the interrogator RF transceiver further comprises means for commanding the RF transmitter circuit of the interrogator RF transceiver to transmit, before transmitting the first interrogation RF signal, a wake-up RF signal at a power level substantially higher than the first power level.

8. A method of interrogating a portable RF transceiver, comprising:

providing an interrogator RF transceiver configured for transmitting interrogation RF signals at a plurality of power levels;

providing a portable RF transceiver configured for communicating with said interrogator RF transceiver, wherein said portable RF transceiver is substantially smaller and lighter than said interrogator RF transceiver;

setting a transmission power of said interrogator RF transceiver at a first power level;

transmitting an interrogation RF signal with said interrogator RF transceiver set at said first power level and waiting for a brief period of time for a response RF signal from said portable RF transceiver to said interrogator RF transceiver;

if said interrogator RF transceiver detects a response RF signal from said portable RF transceiver within said brief period of time, continuing communication between said interrogator RF transceiver and said portable RF transceiver at least at said first power level until communication is complete;

if said interrogator RF transceiver fails to detect a response RF signal from said portable RF transceiver within said brief period of time, increasing said transmission power of said interrogator RF transceiver to a second power level higher than said first power level;

transmitting an interrogation RF signal with said interrogator RF transceiver set at said second power level and waiting for a brief period of time for a response RF signal from said portable RF transceiver to said interrogator RF transceiver; and if said interrogator RF transceiver detects a response RF signal from said portable RF transceiver within said brief period of time, continuing communication between said interrogator RF transceiver and said portable RF transceiver at least at said second power level until communication is complete.

9. The method of claim 8, further comprising increasing said transmission power of said interrogator RF transceiver from a level at which a response RF signal from said portable RF signal is detected before continuing communication with said portable RF transceiver.

10. The method of claim 8, further comprising including informational content of said interrogation RF signal prior to transmission thereof to indicate the power level thereof.

11. The method of claim 8, further including:

if said interrogator RF transceiver fails to detect a response RF signal from said portable RF transceiver responsive to transmission of said interrogation RF signal at said second power level within said brief period of time, increasing said transmission power of said interrogator RF transceiver to a third power level higher than said first power level;

transmitting an interrogation RF signal with said interrogator RF transceiver set at said third power level and waiting for a brief period of time for a response RF signal from said portable RF transceiver to said interrogator RF transceiver; and if said interrogator RF transceiver detects a response RF signal from said portable RF transceiver within said brief period of time, continuing communication between said interrogator RF transceiver and said portable RF transceiver at least at said third power level until communication is complete.

* * * * *

UNITED STATES PATENT AND TRADEMARK OFFICE
CERTIFICATE OF CORRECTION

PATENT NO.   : 6,101,375                                                Page 1 of 1
DATED        : August 8, 2000
INVENTOR(S)  : John R. Tuttle and Charles K. Snodgrass It is certified that error appears in the above-identified patent and that said Letters Patent is hereby corrected as shown below:

Column 2,
Line 26, after "transmitter" and before "of" insert -- 32 --

Signed and Sealed this

Thirtieth Day of March, 2004

JON W. DUDAS
*Acting Director of the United States Patent and Trademark Office*